United States Patent
Wood et al.

(10) Patent No.: US 9,491,070 B2
(45) Date of Patent: Nov. 8, 2016

(54) APPARATUS AND METHOD FOR UTILIZING FOURIER TRANSFORMS TO CHARACTERIZE NETWORK TRAFFIC

(71) Applicant: Blue Coat Systems, Inc., Sunnyvale, CA (US)

(72) Inventors: Matthew S. Wood, Salt Lake City, UT (US); Joseph H. Levy, Eagle Mountain, UT (US)

(73) Assignee: Symantec Corporation, Mountain View, CA (US)

( * ) Notice: Subject to any disclaimer, the term of this patent is extended or adjusted under 35 U.S.C. 154(b) by 342 days.

(21) Appl. No.: 13/861,655

(22) Filed: Apr. 12, 2013

(65) Prior Publication Data

US 2014/0310394 A1 Oct. 16, 2014

(51) Int. Cl.
*G06F 15/173* (2006.01)
*H04L 12/26* (2006.01)
*H04L 12/24* (2006.01)
*G06F 21/55* (2013.01)
*H04L 29/06* (2006.01)

(52) U.S. Cl.
CPC ............ *H04L 43/04* (2013.01); *G06F 21/55* (2013.01); *H04L 41/142* (2013.01); *H04L 63/1416* (2013.01); *H04L 43/026* (2013.01); *H04L 43/028* (2013.01)

(58) Field of Classification Search
CPC ..... H04L 65/403; H04L 67/10; H04L 67/22; H04L 27/2628; H04L 27/2633; H04L 27/265; H04L 43/04; H04L 43/06; H04L 41/142; H04L 43/026; H04L 63/1416; G06F 21/55
See application file for complete search history.

(56) References Cited

U.S. PATENT DOCUMENTS

| | | | | |
|---|---|---|---|---|
| 6,477,685 | B1 * | 11/2002 | Lovelace | 716/56 |
| 8,451,731 | B1 * | 5/2013 | Lee et al. | 370/235 |
| 2006/0161984 | A1 * | 7/2006 | Phillips | G06F 21/564 726/24 |
| 2009/0129288 | A1 * | 5/2009 | Hernacki | 370/253 |
| 2010/0014420 | A1 * | 1/2010 | Wang et al. | 370/229 |
| 2012/0257829 | A1 * | 10/2012 | Fam | H04L 27/0012 382/171 |
| 2013/0073578 | A1 * | 3/2013 | Bland et al. | 707/758 |
| 2015/0073751 | A1 * | 3/2015 | Liao et al. | 702/185 |

* cited by examiner

*Primary Examiner* — Chirag R Patel
*Assistant Examiner* — Jean P Mendez Flores
(74) *Attorney, Agent, or Firm* — Baker Botts L.L.P.

(57) ABSTRACT

A non-transitory computer readable storage medium, comprising executable instructions to collect network traffic data, produce a Fourier signature from the network traffic data, associate the Fourier signature with a known pattern, collect new network traffic data, produce a new Fourier signature from the new network traffic data, compare the new Fourier signature with the Fourier signature to selectively identify a match and associate the new network traffic data with the known pattern upon a match.

8 Claims, 4 Drawing Sheets

APPARATUS AND METHOD FOR UTILIZING FOURIER TRANSFORMS TO CHARACTERIZE NETWORK TRAFFIC

FIELD OF THE INVENTION

This invention relates generally to communications in computer networks. More particularly, this invention relates to utilizing Fourier transforms to characterize network traffic.

BACKGROUND OF THE INVENTION

Detection of an application in network traffic may be instrumental in providing computer security. For example, detection of an application allows one to take prophylactic actions in the event that the application is potentially dangerous. Detection of an application may also be helpful for overall monitoring and evaluation of network traffic.

Unfortunately, certain applications are constructed to avoid detection. For example, port hopping techniques are used to avoid port analyses used to identify an application. Cryptography may be used to avoid application detection through magic byte sequence detection and/or deep packet inspection. Peer-to-peer communications may be used to avoid application detection through server IP network address range analyses.

Similar to the identification of applications on a network, it is often equally beneficial to identify users on a network. Just as many applications evade detection and classification through a variety of techniques, users, too, may intentionally employ methods that obscure their identity. Common techniques include encryption, anonymizing proxy servers, traffic tunneling and remote desktop sessions.

In view of the foregoing, it would be desirable to provide new techniques to classify patterns (e.g., applications and users) in a networked environment.

SUMMARY OF THE INVENTION

A non-transitory computer readable storage medium, comprising executable instructions to collect network traffic data, produce a Fourier signature from the network traffic data, associate the Fourier signature with a known pattern, collect new network traffic data, produce a new Fourier signature from the new network traffic data, compare the new Fourier signature with the Fourier signature to selectively identify a match and associate the new network traffic data with the known pattern upon a match.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
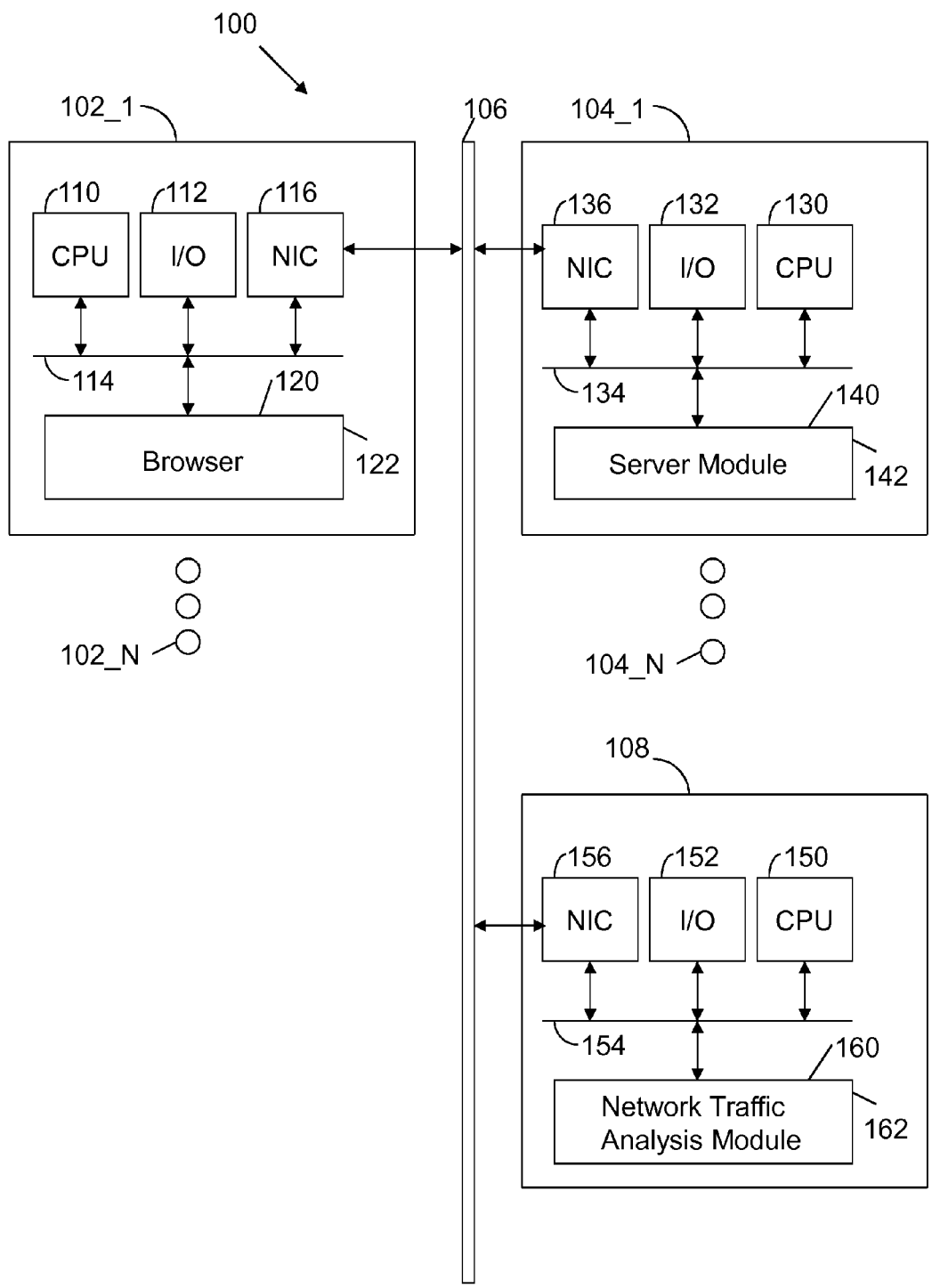
FIG. 1 illustrates a system configured in accordance with an embodiment of the invention.

FIG. 1 illustrates a system 100 configured in accordance with an embodiment of the invention. The system 100 includes client machines 102_1 through 102_N communicating with servers 104_1 through 104_N via a network 106, which may be any wired or wireless network. The network 106 may be an intranet, the public Internet, a local area network (LAN) client/server application, a file sharing application, a transactional network infrastructure protocol such as Domain Name System (DNS), Address Resolution Protocol (ARP) or Network Basic Input/Output System (NetBIOS).

Also included in the system is a network traffic analysis machine 108. The machine 108 analyzes traffic collected from the network 106. Alternately, the traffic may be collected from an external emitter, such as through Simple Network Management Protocol (SNMP), Syslog, NetFlow or Internet Protocol Flow Information Export (IPFIX). The traffic may also be collected from logs generated by external systems or from direct interrogation of endpoints through Application Program Interfaces (APIs). The collected data is analyzed with Fourier transforms to produce Fourier signatures. The Fourier signatures may be subsequently used to analyze network traffic, as discussed below.

Each client machine 102 includes standard components, such as a central processing unit 110 and input/output devices 112 connected via a bus 114. The input/output devices 112 may include a keyboard, touch display, mouse and the like. A network interface circuit 116 is also connected to the bus to provide connectivity to network 106. A memory 120 is also connected to the bus 114. The memory 120 stores executable instructions, such as a browser 122 to coordinate network communications. A client machine may be a personal computer, Tablet, Smartphone, personal digital assistant and the like.

Each server 104 also includes standard components, such as a central processing unit 130, input/output devices 132, a bus 134 and a network interface card 136. A memory 140 is also connected to the bus 134. The memory 140 stores a server module 142 to implement standard server operations.

The nature of the client/server communication might be that of a web-browser to a web-server, a workgroup or domain client (e.g., Windows Active Directory, NTLM®, Samba®, Kerberos, etc.) to a domain controller or file server, a peer-to-peer session, a DNS client querying a DNS server, two Simple Mail Transfer Protocol (SMTP) endpoints exchanging email, a VoIP session, a videoconference, a social media session from a mobile device, traffic tunneled through an encapsulating protocol such as Ipsec, SSL, SSH, GRE, remote desktop sessions through Microsoft RDP, VNC, X, Citrix ICA, traffic passed through an explicit or transparent proxy, etc.

The network traffic analysis machine 108 includes standard components, such as a central processing unit 150, input/output devices 152, a bus 154 and a network interface card 156. A memory 160 is also connected to the bus 154. The memory 160 stores a network traffic analysis module 162 with executable instructions to implement operations of the invention.

Figure 2:
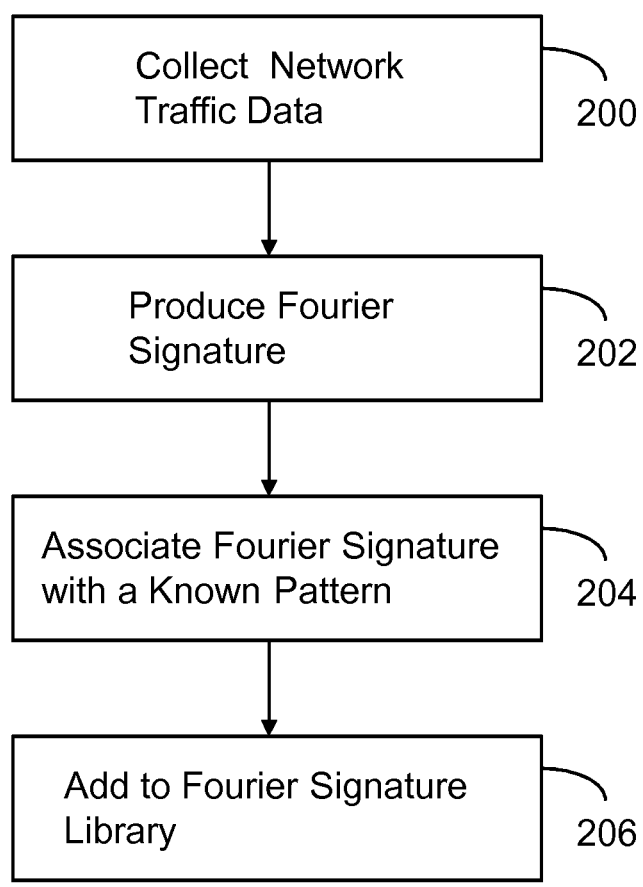
FIG. 2 illustrates Fourier signature library formation operations performed in accordance with an embodiment of the invention.

FIG. 2 illustrates processing operations performed by the network traffic analysis module 162 associated with an embodiment of the invention. In particular, the figure illustrates operations to construct a Fourier signature library. Network traffic data is collected 200. For example, the module 162 may monitor interactions between a client device 102 and servers 104_1 through 104_N. Alternately, the traffic may be collected from an external emitter, from logs generated by external systems or from direct interrogation of endpoints through Application Program Interfaces (APIs).

Regardless of collection technique, the data is subject to Fourier analyses to produce signatures 202. The Fourier analyses involve Fourier transforms. A Fourier transform involves conversion of a mathematical function of time, ƒ(t), into a new function, sometimes denoted by F, whose argument is frequency with units of cycles or radians per second. The new function is known as the Fourier transform and/or the frequency spectrum of the function ƒ.

In one embodiment of the invention, time stamp records for communications between machines are binned. Fourier transforms are performed on the binned records. This produces a Fourier signature characterizing a transmission frequency profile. The Fourier signature is associated with a known pattern (e.g., application or user) 204. That is, the transmission frequency profile associated with a Fourier signature can be matched against a known set of properties to classify an application or user. A classified pattern is added to a Fourier signature library 206.

Figure 3:
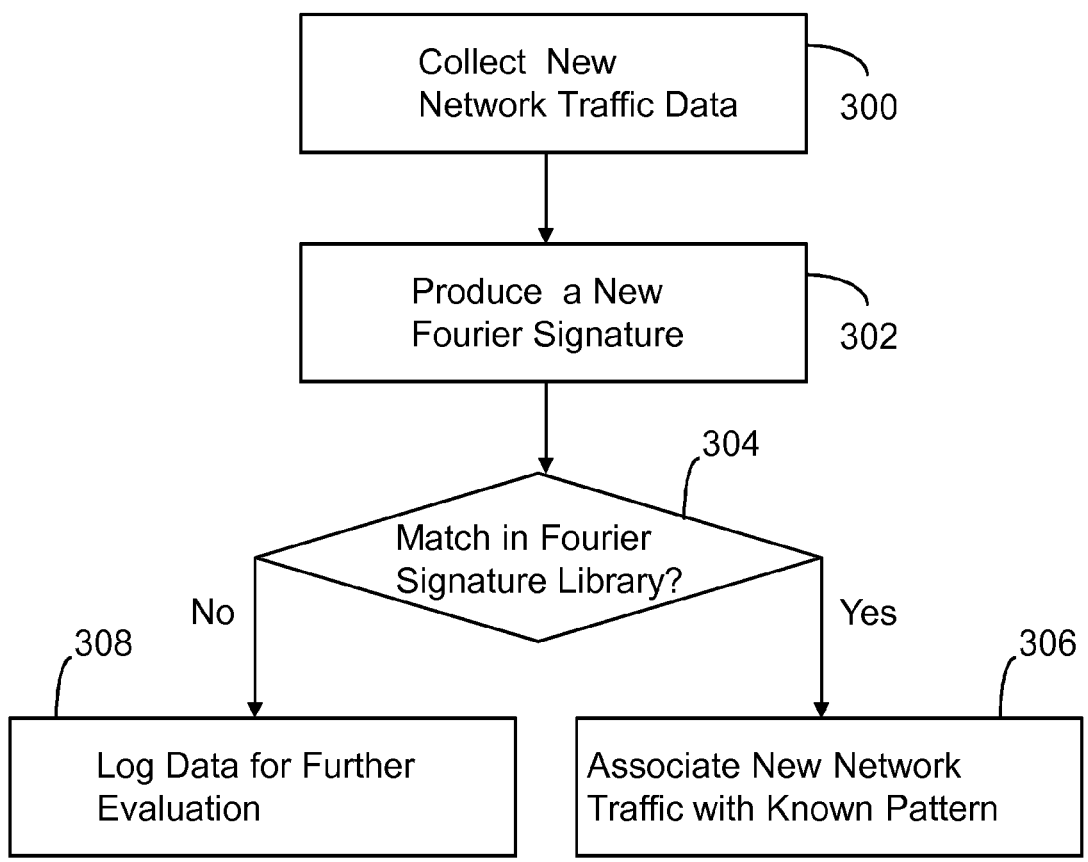
FIG. 3 illustrates network traffic characterization operations performed in accordance with an embodiment of the invention.

Once the Fourier signature library is formed, it can be used to classify new network traffic. FIG. 3 illustrates such operations. Initially, new network traffic data is collected 300. A new Fourier signature is produced from the new network traffic data 302. The new Fourier signature is compared to the Fourier signature library 304. If a match is found (304—Yes), the new network traffic is associated with the known pattern. If a match is not found (304—No), the new Fourier signature is logged for further evaluation 308.

Figure 4:
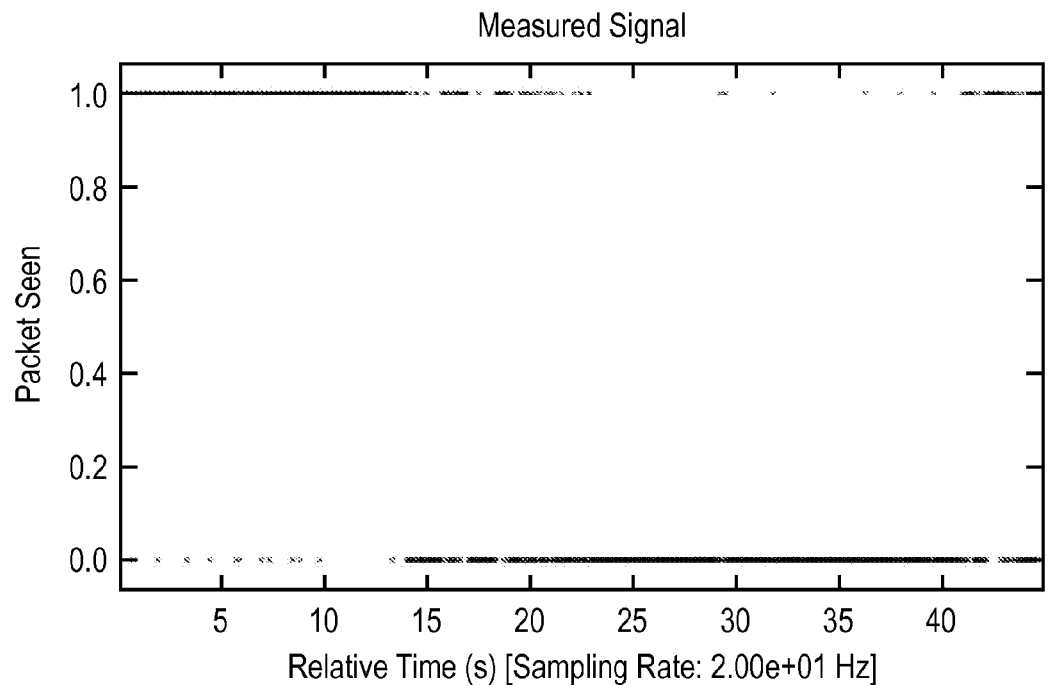
FIG. 4 illustrates network packet traffic data processed in accordance with an embodiment of the invention.

In one embodiment, one of the following properties of packet based communications from n-hosts to m-hosts is collected (where n and m each refer to a collection of one or more virtual or physical machines, and a single machine can exist in both collections):
  Packet transmit time
  Flow start time
  Flow end time
  Flow duration time
  Inter-packet gap time Once these properties are collected into an array, a histogram is formed by binning the array (with bin-width being in units of time.) The bin width may be selected by one or more of: pre-determined values, iterative selection of values, the Sturges, Scott, or Freedman-Diaconis bin-width selection algorithms or via manual user input. For example, FIG. 4 illustrates a sample histogram with the bin width selected as 1/20th of a second or 1 Hertz (HZ.). The figure shows a sample computed signal for 45 seconds of packet capture at a 20 Hz sample rate. Each "1.0" signal amplitude represents a time slice in which one or more packets were transmitted, while each "0.0" signal amplitude represents a time slice in which no packets were transmitted. Alternative definitions for on and off signals may also be used (e.g., whether a new flow starts within a time slice.). On and off signals need not be binary in nature. For example, the signal amplitude could be directly proportional to the number of records in a specific bin.

Figure 5:
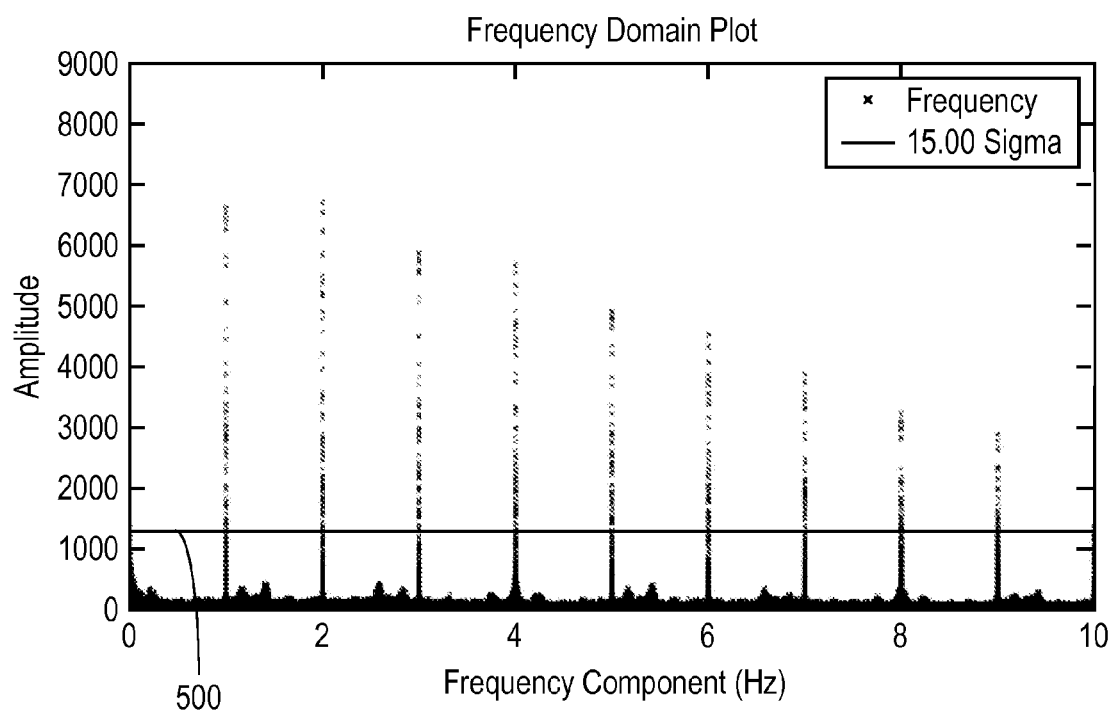
FIG. 5 illustrates a Fourier transformation of the data of FIG. 3.

Each bin is used as a binary amplitude signal measurement of an input waveform. This input signal is Fourier transformed, which gives a frequency spectrum of the resulting output, as shown in FIG. 5. The mean and standard deviation of the frequency modes present in the signal may be determined. Any outliers beyond a certain threshold (automatically or manually chosen) may be reported.

In FIG. 5, line 500 represents the cutoff for 15 standard deviations from the mean signal profile. Observe that there is a 10 Hz (1/10th second) periodic beacon in this communication profile, with harmonic frequency echos seen at 1, 2, 3, 4, 5, 6, 7, 8, and 9 Hertz intervals.

Additional post-processing beyond statistical mean and standard deviation outlier detection may be performed. For example, polynomial fit may be used to find peaks of clustered frequencies, mean detection may be used for small clusters and various peak detection algorithms may be used.

This frequency distribution data is collected for multiple sessions for a known application. A typical histogram profile is created (either from weighted averages, mean and standard deviations or other well known smoothing and averaging algorithms.) This "training" profile is stored for each protocol.

Finally, when an unknown pattern is encountered, it is binned and transformed as described above, and its output histogram profile is compared with known signatures via one or more well-known correlation tests, such as the Kolmogorov-Smirnov test, the Chi-Square test, etc. Based on agreement with training data via automatic or manually determined thresholds, one or more protocol identifications can be made.

Advantageously, only timing data is needed to detect and classify patterns. Timing data is readily available to network providers, even while operating under strict data-privacy laws. This pattern detection technique may be used in a standalone manner. Alternately, the method may augment existing detection platforms and algorithms.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
   a processor; and
   a memory connected to the processor, the memory storing instructions executed by the processor to:
   collect packet based network traffic timing data into an array;
   form a histogram by binning the array into individual bins representing units of time;
   produce a Fourier signature from the packet based network traffic timing data, wherein the instructions to produce include instructions to use each bin as a binary amplitude signal measurement that is Fourier transformed;
   associate the Fourier signature with a known pattern associated with a dangerous application or user;
   add the Fourier signature to a Fourier signature library comprising previously produced Fourier signatures associated with dangerous applications or users;
   collect new packet based network traffic timing data into a new array;
   form a histogram by binning the new array into individual bins representing units of time;
   produce a new Fourier signature from the new packet based network traffic timing data, wherein the instructions to produce include instructions to use each bin as a binary amplitude signal measurement that is Fourier transformed;
   compare the new Fourier signature with the Fourier signature of the Fourier signature library to selectively identify a Fourier signature match;
   associate the new network traffic data with the known pattern upon the Fourier signature match: and
   take computer security prophylactic actions against the dangerous application or user in response to the Fourier signature match.

2. The machine of claim 1 wherein the packet based network traffic timing data is selected from a packet transmit time, a packet flow start time, a packet flow end time, and a packet flow duration time.

3. The machine of claim 1 wherein the Fourier signature has a frequency spectrum indicative of network packet traffic.

4. The machine of claim 3 wherein the memory stores instructions executed by the processor to compute the mean and standard deviation of frequency modes present in the frequency spectrum to identify signal outliers.

5. The machine of claim 3 wherein the memory stores instructions executed by the processor to identify clustered frequencies in the frequency spectrum.

6. The machine of claim 3 wherein the memory stores instructions executed by the processor to identify cluster peaks in the frequency spectrum.

7. The machine of claim 1 wherein the memory stores instructions executed by the processor to perform a correlation test between the new Fourier signature and the Fourier signature.

8. The machine of claim 1 wherein the memory stores instructions executed by the processor to log the new Fourier signature for further evaluation upon failure to identify a match.

* * * * *